(12) United States Patent
Hamlet et al.

(10) Patent No.: US 10,177,922 B1
(45) Date of Patent: Jan. 8, 2019

(54) REPEATABLE MASKING OF SENSITIVE DATA

(71) Applicant: National Technology & Engineering Solutions of Sandia, LLC, Albuquerque, NM (US)

(72) Inventors: Jason Hamlet, Albuquerque, NM (US); Ryan Helinski, Albuquerque, NM (US); Todd Bauer, Albuquerque, NM (US); Lyndon G. Pierson, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 290 days.

(21) Appl. No.: 15/077,594

(22) Filed: Mar. 22, 2016

Related U.S. Application Data

(60) Provisional application No. 62/138,238, filed on Mar. 25, 2015.

(51) Int. Cl.
 *H04L 9/00* (2006.01)
 *G06F 21/14* (2013.01)
 (Continued)

(52) U.S. Cl.
 CPC .......... *H04L 9/3278* (2013.01); *G06F 21/57* (2013.01); *G06F 2221/034* (2013.01);
 (Continued)

(58) Field of Classification Search
 CPC ....... H04L 9/3278; H04L 9/32; H04L 9/3221; G06F 21/57; G06F 2221/034; G06F 2221/2105; G06F 2221/2153
 See application file for complete search history.

(56) References Cited

U.S. PATENT DOCUMENTS 8,885,819 B2    11/2014  Gotze et al.
9,279,850 B1 *   3/2016  Pedersen .............. H03K 19/003
(Continued)

OTHER PUBLICATIONS

Suh, et al., "Physical Unclonable Functions for Device Authentication and Secret Key Generation" Design Automation conference, DAC '07 Jun. 2007, pp. 9-14.
(Continued)

*Primary Examiner* — Mohammad A Siddiqi
(74) *Attorney, Agent, or Firm* — Medley, Behrens & Lewis, LLC

(57) ABSTRACT

The various technologies presented herein relate to enabling a value generated based upon a physical unclonable function (PUF) response to be available as needed, while also preventing exposure of the PUF to a malicious entity. A masked PUF response can be generated based upon applying a function to a combination of the PUF response and a data file (e.g., a bitstream), and the masked PUF response is forwarded to a requesting entity, rather than the PUF response. Hence, the PUF is masked from any entity requiring access to the PUF. The PUF can be located in a FPGA, wherein the data file is a bitstream pertinent to one or more configurable logic blocks included in the FPGA. A first masked PUF response generated with a first data file can have a different value to a second masked PUF response generated with a second data file.

15 Claims, 4 Drawing Sheets

(51) Int. Cl.
*H04L 9/32* (2006.01)
*G06F 21/57* (2013.01)
(52) U.S. Cl.
CPC ........... *G06F 2221/2105* (2013.01); *G06F 2221/2153* (2013.01); *H04L 9/32* (2013.01); *H04L 9/3221* (2013.01)

(56) References Cited

U.S. PATENT DOCUMENTS

| | | | |
|---|---|---|---|
| 2008/0059809 A1 | 3/2008 | Van Dijk | |
| 2011/0215829 A1* | 9/2011 | Guajardo Merchan | G06F 7/588 326/8 |
| 2013/0051552 A1* | 2/2013 | Handschuh | G06F 21/602 380/44 |
| 2013/0142329 A1 | 6/2013 | Bell et al. | |
| 2015/0012737 A1* | 1/2015 | Newell | G06F 21/575 713/2 |
| 2015/0058928 A1* | 2/2015 | Guo | H04L 63/08 726/3 |
| 2015/0178143 A1* | 6/2015 | Mathew | G06F 11/0793 714/5.1 |
| 2015/0317481 A1* | 11/2015 | Gardner | H04L 9/3278 726/2 |
| 2017/0295015 A1* | 10/2017 | Pedersen | H04L 9/0861 |
| 2017/0310489 A1* | 10/2017 | Van Der Sluis | G09C 1/00 |

OTHER PUBLICATIONS

Ruhrmair, et al. "Modelling Attacks on Physical Unclonable Functions", 17th Association for Computing Machinery Computer and Communications Security (ACM CCS), 2010, pp. 1-13.

* cited by examiner

REPEATABLE MASKING OF SENSITIVE DATA

RELATED APPLICATION

This application claims priority to U.S. Provisional Patent Application No. 62/138,238, filed on Mar. 25, 2015, and entitled "REPEATABLE MASKING OF SENSITIVE DATA", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

In some situations it is desirable for data to be made available for use by systems other than that which generated the data. However, it may also be desired that the data is not compromised by, nor revealed to, a secondary system. It is further desired that the data is unable to be obtained by a malicious system. For example, a physical unclonable function (PUF) can be utilized on a field programmable gate array (FPGA) to provide a level of data security; however, any security benefits imparted by an output of the PUF can be compromised if the PUF response is obtained directly from the PUF.

SUMMARY

The following is a brief summary of subject matter that is described in greater detail herein. This summary is not intended to be limiting as to the scope of the claims.

The various embodiments presented herein relate to enabling a value generated based upon a physical unclonable function (PUF) response to be available as needed, while also preventing exposure of the PUF response to a malicious entity. In an embodiment, the PUF can be located in a field programmable gate array (FPGA), on an application specific integrated circuit (ASIC) that includes the FPGA, on a FPGA with an embedded microprocessor(s), etc. A data file (e.g., a bitstream, a configuration file, etc.) can be received at the FPGA, the microprocessor, etc.

In an embodiment, in the event of the data file being a configuration file, the configuration file is configured to program the FPGA (e.g., configure the one or more configurable logic blocks included in the FPGA), rather than exposing the PUF (e.g., the PUF response) to the configured logic blocks (and thus user logic), a masked PUF response (which is based upon the PUF response) is presented to the configured logic blocks, wherein the actual PUF response is indeterminable from the aforementioned masked PUF response.

In an exemplary embodiment, the masked PUF response can be a function of the PUF response and the configuration file. For instance, a cryptographic unit on the FPGA or in communication with the FPGA (on the aforementioned ASIC or the microprocessor) can apply a function to the PUF response and the configuration file (e.g., a concatenation of the PUF response and the configuration file), and then generate a hash of the outout of the function. The cryptographic unit may then return the hash as the masked PUF response. The function and/or the hash can be a cryptographic hash, a one way hash, a non-invertible function.

It can be ascertained that, so long as the configuration file is unchanged, the cryptographic unit will provide the configured logic blocks with the same masked PUF response. The configured logic blocks, however, are prevented from acquiring the actual PUF response.

Further, if the configuration file is changed, the (newly) configured logic blocks will be provided with a different masked PUF response than what was provided to the previously configured logic blocks. Thus, the newly configured logic blocks, if configured maliciously, are unable to learn the masked PUF response used by the previously configured logic blocks to generate cryptographic keys.

The foregoing can be expressed mathematically: when the logic blocks configured in accordance with a first configuration file (u) request a response (P) from the PUF, the cryptographic unit can return a first masked PUF response P' based upon the following: $P'=h(f(P,u))$, where h is a hash function (e.g., a cryptographic hash), $f$ is repeatable (deterministic) function, and P and u are inputs to such function. When the logic blocks configured in accordance with a second configuration file (u') request a response (P) from the PUF, the cryptographic unit can return a second masked PUF response P'' using the same approach $P''=h(f(P,u'))$.

Accordingly, where the PUF is being utilized as a security primitive for the FPGA (e.g., by a design programmed into the FPGA), the security of the PUF is maintained as the PUF response is not directly exposed, thereby preventing a malicious entity from obtaining the PUF response for its own ends.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
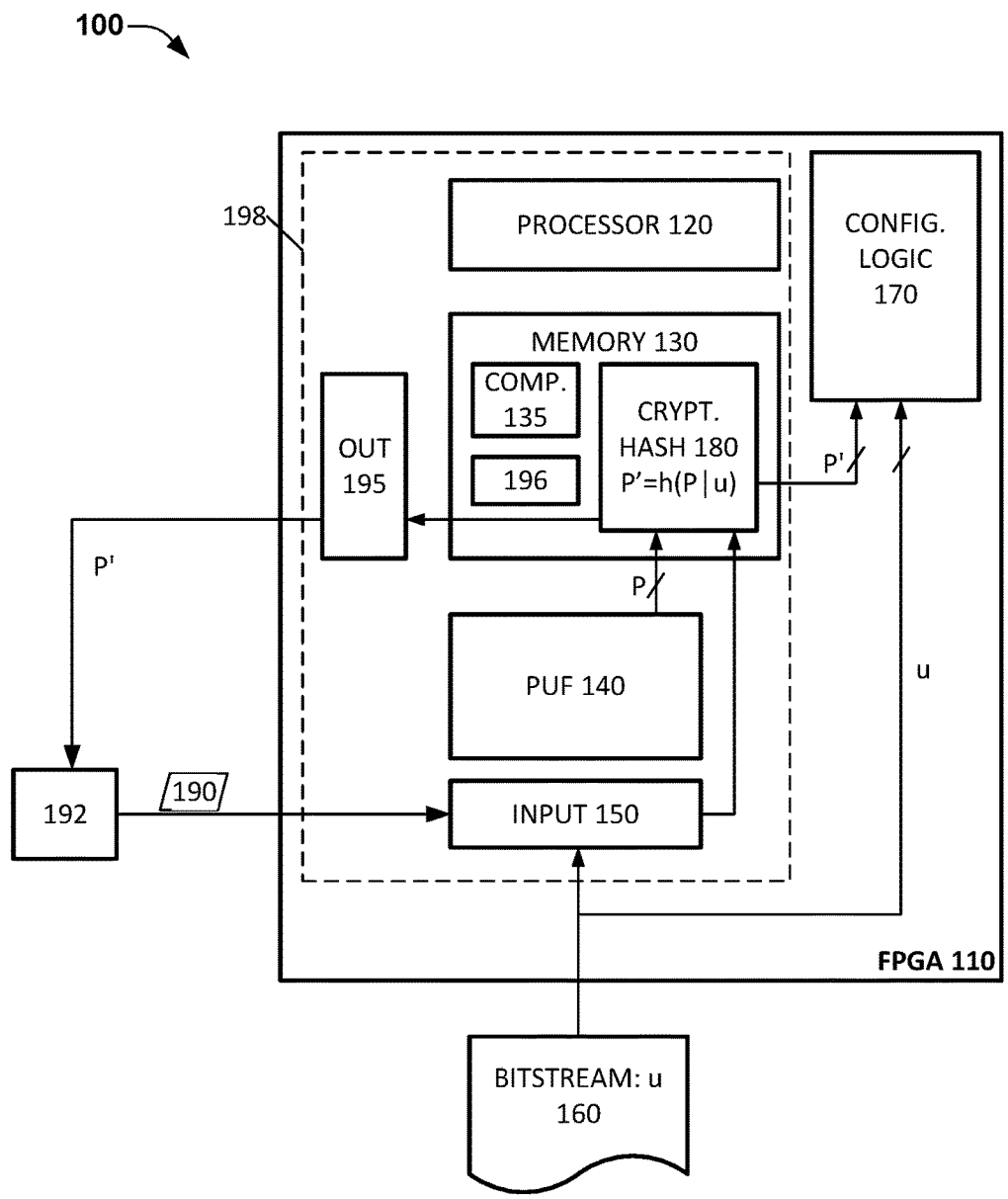
FIG. 1 is a block diagram of an exemplary computing system that is configured to obscure a PUF value.

Various technologies are presented herein pertaining to controlling access to a response from a physical unclonable function (PUF), wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As previously mentioned, in a particular situation it may be desirable for sensitive data to be made available for use by systems other than that which generated the sensitive data. However, while such availability may be desired, such availability should not compromise or reveal the sensitive data, and further, the sensitive data should be exposed in such a way that malicious system(s) cannot obtain the sensitive data. Hence, it is desired that the sensitive data can be reliably obtained, as needed, by a known system but is not exposed to attack by a malicious entity.

In an exemplary configuration, a field-programmable gate array (FPGA) can include a hard physical unclonable function (PUF) as an element of the integrated circuit (IC) that includes the FPGA. The PUF can be utilized as a security primitive by designs programmed into the FPGA. However, the security of a system(s) utilizing the PUF is compromised if the value of the PUF measurement itself can be directly obtained. This is problematic since, for example, a malicious design could simply measure and output the PUF value. Hence, it is desired to make the PUF available for use by a particular user-logic while avoiding vulnerabilities such as the foregoing. To avoid such vulnerabilities, the value presented to the user-logic is to be decoupled from the PUF response. This decoupling can obscure (mask) the PUF response so that it is not possible to ascertain the PUF response from the value presented to user-logic. Additionally, the decoupling should be repeatable so that the user-logic obtains the same value each time it queries the PUF. As further described, the value presented to the user-logic can be a masked PUF response (e.g., a cryptographic key) generated by a cryptographic hash operation.

FIG. 1 illustrates a system 100 that can be utilized to render a PUF value available to user-logic while obscuring the PUF response generated by the PUF to prevent malicious attack. System 100 includes a FPGA 110 (e.g., an embedded processor FPGA), wherein the FPGA 110 optionally comprises a processor 120 and memory 130, wherein the memory 130 comprises data that is accessible to the processor 120 and instructions that can be executed by the processor 120. The memory 130 can further include a comparison component 135 which can be utilized to compare two or more values, as further described below. It is to be appreciated that while the system 100 illustrates an FPGA with an embedded processor, the various embodiments are also applicable to a system comprising a microprocessor (or other machine device) that is separate device, but coupled to the FPGA, an FPGA and a processor combined in an ASIC, a trusted platform module (TPM), etc.

The FPGA 110 can further include a PUF 140, which can be configured to generate a PUF value P in response to a stimulation (stimulus), wherein such stimulation can be applied to the PUF 140 by the processor 120, by hardware of the FPGA, etc. In an embodiment, the stimulation of the PUF can be in response to a request for a PUF response value being received, a data file being received, etc.

FPGA 110 can further include an input component 150, wherein the input component 150 can be configured to receive a data file. In an embodiment, the data file can be a bitstream (u) 160. Further, the bitstream u can be a binary file that describes a digital-logic circuit, binary data for a software program, a configuration user-logic bitstream, a password (e.g., a pertaining to the FPGA 110), biometric data (e.g., biometric data pertaining to the FPGA 110), etc.

The FPGA 110 can further include a configurable logic block(s) 170, wherein the configurable logic block(s) 170 can be user-configurable. In an embodiment, the configurable logic block(s) 170 can be configured based upon the bitstream u.

In a conventional configuration, the bitstream u can be received directly by the configurable logic block(s) 170. However, as shown in FIG. 1, the memory 130 can further include a cryptographic hash component 180 which can be configured to receive the bitstream u and an output P from the PUF 140. In an embodiment, the cryptographic hash component 180 can be a one-way hash function, a non-invertible function, etc.

A general embodiment for the operation of the PUF 140 and the cryptographic hash component 180 is now presented. P is a PUF response generated by the PUF 140, $f(\ )$ can be a repeatable function and $x_0 \ldots x_n$ are additional inputs to $f(\ )$. In an embodiment, to facilitate a high level of security, $f(\ )$ should be repeatable and non-invertible, although this is not strictly required. Further, $g0, \ldots, gn+1$ are functions. The general solution to obscuring P while enabling data to be accessed as needed is to present (publish) a value $P'=f(P,x_0, \ldots, x_n)$ to the configurable logic block(s) 170. $f(\ )$ can be a non-invertible function, a one-way hash, a cryptographic hash, etc.

In a more specific embodiment, u is the bitstream 160 loaded into the FPGA 110, where $h(\ )$ is a cryptographically secure one-way hash function executable by the cryptographic hash component 180, and $f(\ )$ is a function, wherein $P'=h(f(P,u))$ is the output of the cryptographic hash component 180. Since $h(\ )$ is a one-way hash function, P cannot be determined from P'. Whenever the FPGA 110 is configured with the user-logic bitstream u, the same P' can be measured as an output of the cryptographic hash component 180. However, if a different configuration user-logic bitstream u' is utilized, then P''' is obtained, wherein $P'''=h(f(P,u'))\neq P'$. Consequently, only a configuration utilizing the bitstream u can obtain the P' that the bitstream u uses as a security primitive. In another embodiment, a generalization can include, for example, calculating $P'=h(r[f(P), g(u)])$ where $r(\ )$ and $g(\ )$ are functions.

It is to be appreciated that while the various embodiments presented herein are directed towards a PUF response being generated in accordance with a configuration bitstream, a PUF response can be generated in response to any stimulus. For example, the processor 120 executes a program that requires a PUF response. Rather than providing the program with the PUF response P, a masked PUF response P' can be provided, thereby ensuring that the PUF response P is not exposed to the program.

As further shown in FIG. 1, a request 190 for the PUF value can be received from an external device 192, e.g., a processor remotely located and communicatively coupled, to the FPGA 110. In an embodiment, the external device 192 can be a processor on another FPGA that requires a PUF value from the FPGA 110. In an embodiment, the request 190 can include a data file, wherein the data file is combined with the PUF response P, and the cryptographic hash 180 is applied thereto, with a response comprising the masked PUF value P' being transmitted to the external device 192 (e.g., via an output device 195). In another embodiment, a recently generated masked PUF response P' can be transmitted to the external device 192, wherein a table 196 can be generated to include an address of the requesting device 192, the masked PUF response P' transmitted to the requesting device 192, and a bitstream value u utilized in the generation of the masked PUF response P'.

In another embodiment, the request 190 can initiate generation of the masked PUF P' based upon the PUF response P in combination with the bitstream u received at the FPGA 110.

The processor 120, memory 130, PUF 140, input component 150, and/or the output component 195 can be considered to be a hard logic portion (integrated circuit (IC) portion) of the FPGA 110, as indicated by the hashed box 198.

It is to be appreciated that while not shown, the PUF 140 can include a fuzzy extractor to compensate for any noise in the PUF response P generated by the PUF 140. For example, when the PUF 140 is initially accessed (stimulated) during the generation of P', a first PUF response P (e.g., $P_1$) has the same value as a second PUF response P (e.g., $P_2$) generated during a subsequent stimulation of the PUF 140 during generation of P'''. Accordingly, any variation between the first masked PUF response P' and the second masked PUF response P''' is due to a difference between respective content of the first bitstream u and the second bitstream u', and any noise effects at the PUF 140 are mitigated.

Figure 2:
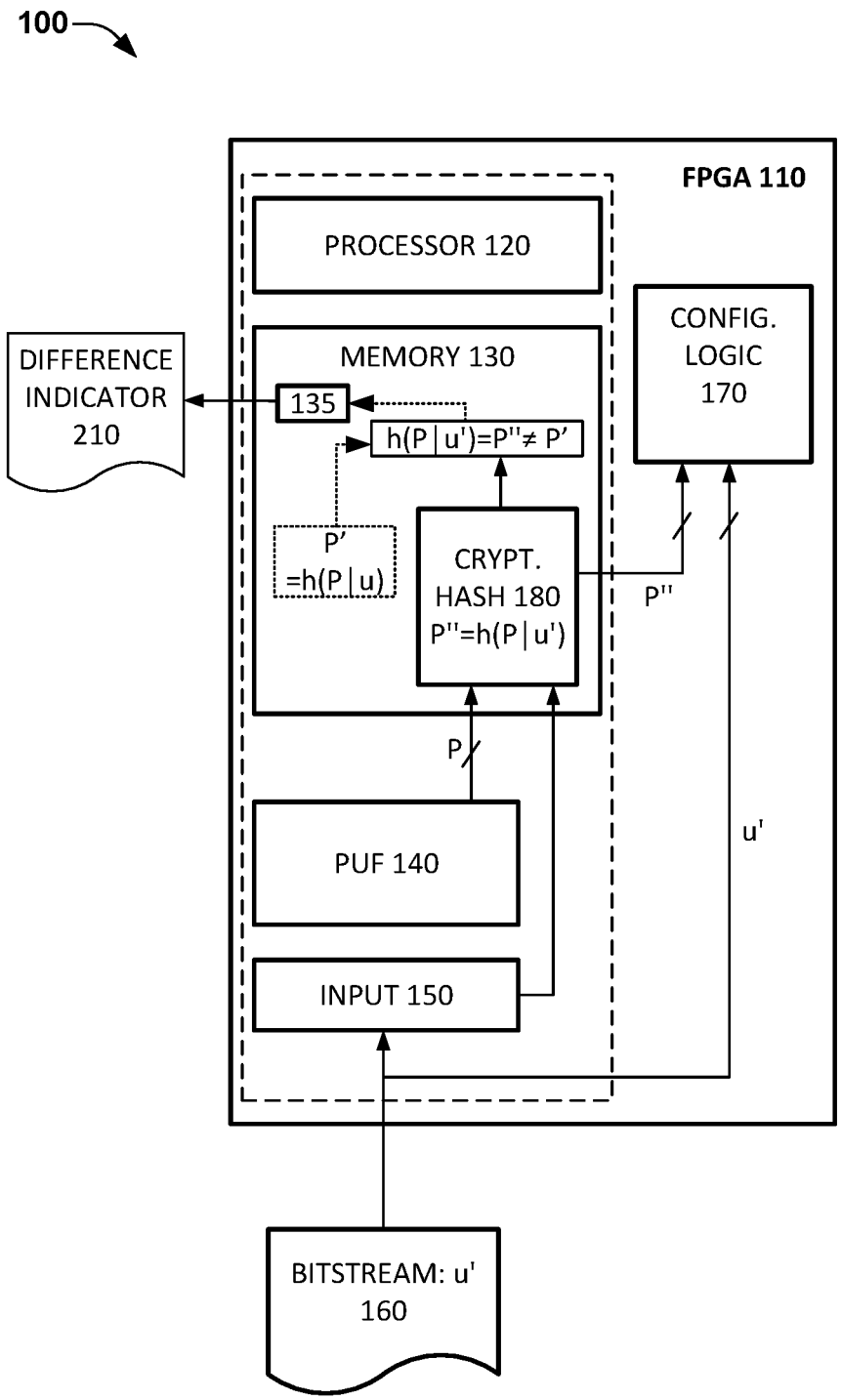
FIG. 2 is a block diagram of an exemplary computing system that is configured to obscure a PUF value.

FIG. 2 illustrates the system 100 being utilized to generate a masked PUF response from a second bitstream u'. As previously mentioned, when different respective bitstreams (u and u') are utilized to generate respective PUF responses from the same PUF response P, masked PUF responses having different values are generated. Per FIG. 1, the first masked PUF response P' is generated based upon the bitstream u, while, as shown in FIG. 2, the second masked PUF response P''' is generated based upon the bitstream u', even though in both embodiments the same PUF response P is utilized to generate the respective masked PUF responses P' and P'''. While the respective masked PUF responses P' and P''' can have the same format as the PUF response P, e.g., a fixed-size alphanumeric string/value, the PUF response P is not exposed, and accordingly, P is not revealed to a malicious entity.

As shown in FIG. 2, the comparison component 135 can be utilized to compare the value of respective masked PUF responses generated by the cryptographic hash component 180 and further generate a difference indicator 210 which indicates whether a value of a masked PUF response is different to an expected value. In an embodiment where respective masked PUF responses are generated from the same bitstream u, then each masked PUF response is generated with a value P', and the difference indicator 210 indicates the masked PUF response has an expected value, from which it can be inferred that the bitstream u is common to each masked PUF response. In an embodiment where a first masked PUF response is generated from a first bitstream u (e.g., the first masked PUF response has a value P'), and a second masked PUF response is generated from a second bitstream u' (e.g., the second masked PUF response has a value P'''), the comparison component 135 can make a determination that P'''≠P' and based thereon, generate a difference indicator 210 indicating that P'''≠P', wherein an inference can be made that the first masked PUF response and second masked PUF response were generated from different bitstreams (e.g., respectively u and u').

Figure 3:
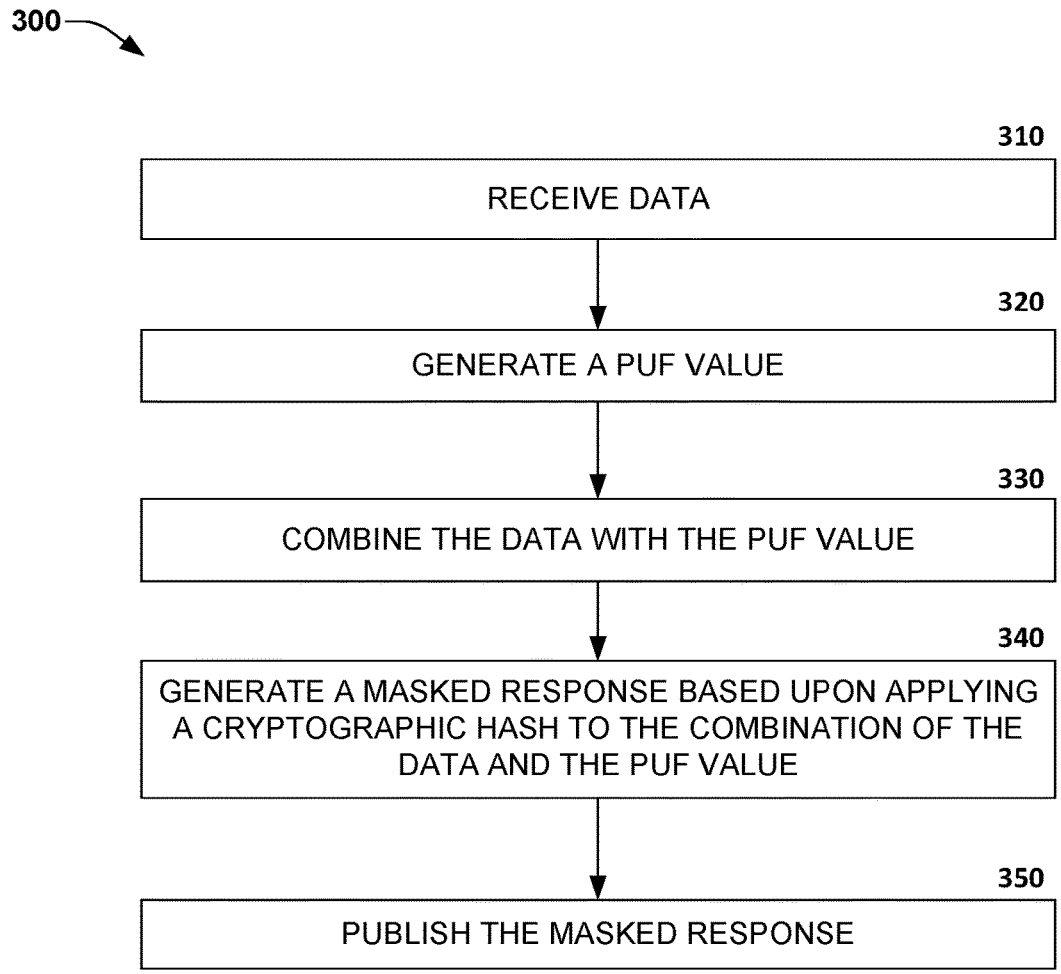
FIG. 3 is a flow diagram illustrating an exemplary methodology for preventing exposure of a PUF value.

FIG. 3 illustrates an exemplary methodology relating to obscuring an output from a PUF. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

At 310, data can be received at a device, wherein the device can be a FPGA. The FPGA can comprise hard logic (e.g., a processor, memory, etc.) and also include a plurality of reconfigurable blocks. In an embodiment, the data can be a bitstream that is to be applied to the plurality of reconfigurable blocks, e.g., the bitstream is configuration data.

At 320, a PUF value is generated by a PUF, wherein the PUF can be located in the hard logic of the FPGA. In an embodiment, the PUF value can be generated in response to a stimulation from a processor included in the hard logic of the FPGA.

At 330, the PUF value can be combined with the data.

At 340, a function and/or a hash can be applied to the combination of the PUF value and the data, wherein application of the function (and, for example, a hash) to the PUF value and data combination generates a masked PUF response (e.g., a cryptographic key).

At 350, the masked PUF response can be published, e.g., made available to one or more of the reconfigurable blocks, an external device, etc. Accordingly, while the masked PUF response has been generated from a PUF value, the PUF value is obscured by the data with which the masked PUF response is generated.

Figure 4:
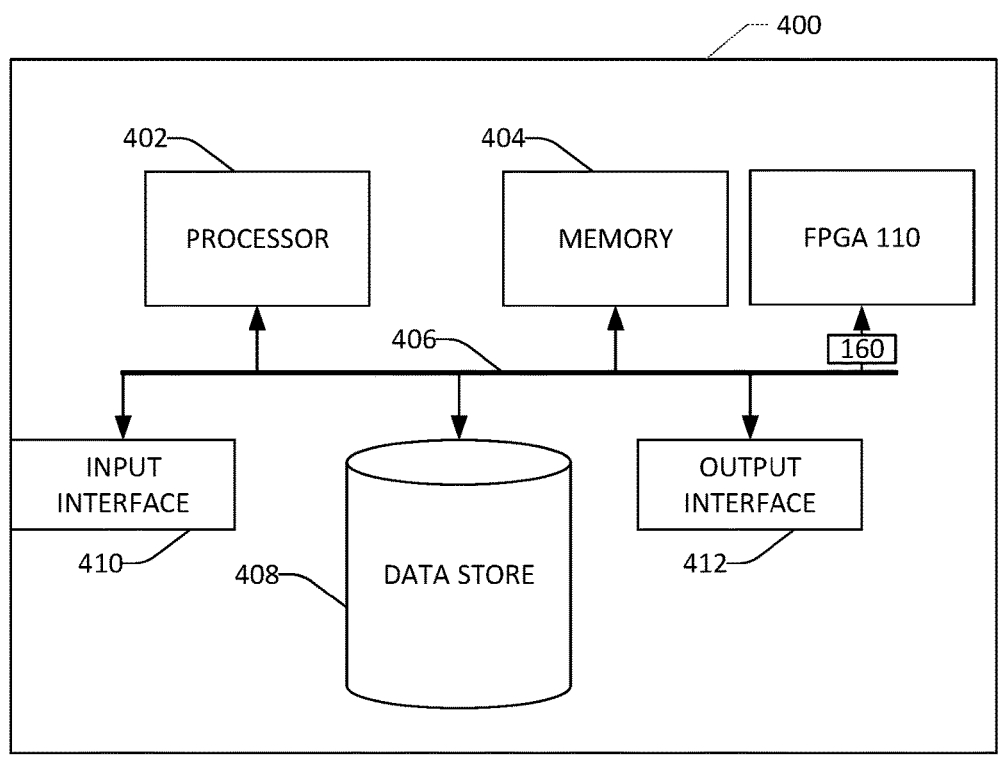
FIG. 4 illustrates an exemplary computing device.

Referring now to FIG. 4, a high-level illustration of an exemplary computing device 400 that can be used in accordance with the systems and methodologies disclosed herein is illustrated. For example, the computing device 400 includes the FPGA 110, wherein the bitstream 160 is to be utilized by the FPGA 110. The computing device 400 includes at least one processor 402 (e.g., operating as processor 120) that executes instructions that are stored in a memory 404. The instructions may be, for instance, instructions for implementing functionality described as being carried out by one or more components discussed above or instructions for implementing one or more of the methods described above. The processor 402 may access the memory 404 by way of a system bus 406. In addition to storing executable instructions, the memory 404 may also store operating parameters, required operating parameters, and so forth.

The computing device 400 additionally includes a data store 408 that is accessible by the processor 402 by way of the system bus 406. The data store 408 may include executable instructions, operating parameters, required operating parameters, etc. The computing device 400 also includes an input interface 410 that allows external devices to communicate with the computing device 400. For instance, the input interface 410 may be used to receive instructions from an external computer device, from a user, etc. The computing device 400 also includes an output interface 412 that interfaces the computing device 400 with one or more external devices. For example, the computing device 400 may display text, images, etc., by way of the output interface 412.

Additionally, while illustrated as a single system, it is to be understood that the computing device 400 may be a distributed system. Thus, for instance, several devices may be in communication by way of a network connection and may collectively perform tasks described as being performed by the computing device 400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
   receiving a response value from a physical unclonable function (PUF);
   receiving a first data file, the first data file comprising first configuration data that is applied to at least one configurable logic block of a field programmable gate array (FPGA);
   computing a function, wherein the response value and the first data file are inputs to the function, and further wherein the function, when computed with the response value and the first data file, generates a first masked PUF response, wherein the response value cannot be obtained from the first masked PUF response without knowledge of the first data file;
   outputting the first masked PUF response to a remotely located device, wherein responsive to receiving the first masked PUF response the remotely located device performs a computing operation based upon the first masked PUF response;
   receiving a second data file, the second data file comprising second configuration data that is applied to at least one configurable logic block of the FPGA;
   computing the function, wherein the second data file and the response value are inputs to the function, and further wherein the function, when computed with the second data file and the response value, generates a second masked PUF response, wherein the first masked PUF response and the second masked PUF response have different values; and
   outputting the second masked PUF response to the remotely located device, wherein responsive to receiving the second masked PUF response the remotely located device is unable to perform the computing operation.

2. The method of claim 1, wherein the response value is received in response to a stimulus applied to the PUF, the stimulus is applied to the PUF in response to a request for the PUF value.

3. The method of claim 1, wherein the data file is a binary file, a configuration file, a configuration user-logic bitstream, or a bitstream.

4. The method of claim 1, wherein the PUF is incorporated into an integrated circuit that comprises the field programmable gate array (FPGA).

5. The method of claim 1, further comprising:
   comparing the second masked PUF response with the first masked PUF response; and
   in response to determining that the first masked PUF response and the second masked PUF response have different values, generating an indication that the first masked PUF response and second masked PUF response were generated with different data files.

6. The method of claim 1, wherein the function comprises a one way hash function.

7. The method of claim 1, further comprising:
   receiving a request for the response value to be generated by the PUF, wherein the request is received from the remotely located device.

8. A system comprising:
   a processor; and
   memory, wherein the memory comprises instructions that, when executed by the processor, cause the processor to perform acts comprising:

obtaining a response from a physical unclonable function (PUF);

receiving a first data file, the first data file comprising first configuration data for a configurable logic block of a field programmable gate array (FPGA); and applying a function to the response and the first data file to generate a first masked PUF response, wherein the response cannot be obtained from the first masked PUF response without knowledge of the first data file;

outputting the first masked PUF response to a device that is communicatively coupled to the processor, wherein responsive to receiving the first masked PUF response the device that is communicatively coupled to the processor performs a computing operation based upon the first masked PUF response;

receiving a second data file, the second data file comprising second configuration data for the configurable logic block of the FPGA;

applying the function to the response and the second data file to generate a second masked PUF response; and outputting the second masked PUF response to the device that is communicatively coupled to the processor, wherein responsive to receiving the second masked PUF response the device that is communicatively coupled to the processor is unable to perform the computing operation.

9. The system of claim 8, wherein the processor, the memory, and the PUF are included in the FPGA.

10. The system of claim 8, wherein the processor, the memory, and the PUF are included in an application specific integrated circuit (ASIC), the ASIC further comprising the FPGA.

11. The system of claim 8, wherein the function comprises a one way hash function.

12. The system of claim 8, wherein the device comprises the FPGA.

13. A computer-readable storage medium comprising instructions that, when executed by a processor, cause the processor to perform acts comprising:

receiving a first data file comprising first configuration data for at least one configurable logic block included in a field programmable gate array (FPGA);

in response to receiving the first data file, applying a stimulus to a physical unclonable function (PUF);

receiving a response value from the PUF;

applying a function to the response value and the first data file to generate a first masked PUF response, wherein the response value cannot be obtained from the first masked PUF response without knowledge of the first data file;

outputting the first masked PUF response to a device that is communicatively coupled to the processor, wherein responsive to receiving the first masked PUF response the device that is communicatively coupled to the processor performs a computing operation based upon the first masked PUF response;

receiving a second data file, the second data file comprising second configuration data for at least one configurable logic block included in the FPGA;

generating a second masked PUF response, Wherein the second masked PUP response is response value cannot be obtained from the second masked PUF response without knowledge of the second data file; and outputting the second masked PUF response to the device that is communicatively coupled to the processor, wherein the device that is communicatively coupled to the processor is unable to perform the computing operation based upon the second masked PUF response.

14. The computer-readable storage medium of claim 13, the acts further comprising:

receiving a request for a value of the physical unclonable function (PUF), wherein the request is generated by the device communicatively coupled to the processor.

15. The computer-readable storage medium of claim 13, wherein the device comprises the FPGA.

* * * * *